US006995482B2

(12) United States Patent
Midya et al.

(10) Patent No.: US 6,995,482 B2
(45) Date of Patent: Feb. 7, 2006

(54) SWITCHING CIRCUIT AND METHOD THEREFOR

(75) Inventors: Pallab Midya, Schaumburg, IL (US); Cesar Pascual, Urbana, IL (US); Lawrence Edwin Connell, Naperville, IL (US)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 10/828,090

(22) Filed: Apr. 20, 2004

(65) Prior Publication Data

US 2004/0195918 A1    Oct. 7, 2004

Related U.S. Application Data

(62) Division of application No. 09/477,985, filed on Jan. 20, 2000, now abandoned.

(51) Int. Cl.
    *H02B 1/24*        (2006.01)
(52) U.S. Cl. .................. 307/112; 307/134; 307/135
(58) Field of Classification Search ................ 307/112, 307/134, 135
    See application file for complete search history.

(56) References Cited

U.S. PATENT DOCUMENTS

| 5,933,453 A | * | 8/1999 | Lewison ..................... 375/238 |
| 6,414,613 B1 | | 7/2002 | Midya et al. |
| 6,473,457 B1 | | 10/2002 | Pascual et al. |
| 6,665,338 B1 | | 12/2003 | Midya et al. |

FOREIGN PATENT DOCUMENTS

| WO | WO 98/44626 | 10/1998 |
| WO | WO 99/59241 | 11/1999 |

OTHER PUBLICATIONS

Mosely, I.D. et al; "Effect of dead time on harmonic distortion in class-D audio power amplifiers"; Electronic Letters; Jun. 10, 1999; pp 920-952; vol. 35, Issue 12; IEEE.

Nielsen, Karsten; "PEDEC—A Novel Pulse Referenced Control Method for High Quality Digital PWM Switching Power Amplification"; IEEE; 1998; pp 200-207; IEEE.

Midya, P. et al.; "Sensorless current mode control-an observer-based technique for DC—DC converters"; Power Electronics Specialists Conference, Jun. 22-27, 1997; pp 197-202; vol. 1; IEEE.

Kimball, J. et al; "Continuous-time optimization of gate timing for synchronous rectification"; IEEE 39th Midwest Symposium on Circuits and Systems; Aug. 18-21, 1996; pp 1015-1018; vol. 3; IEEE.

\* cited by examiner

*Primary Examiner*—Robert L. Deberadinis
(74) *Attorney, Agent, or Firm*—Joanna G. Chiu

(57) ABSTRACT

A method for providing a current path during switching transitions of a switching circuit while limiting the short circuit current. In one embodiment, a switching circuit includes a passive break-before-make element in series with two switches. An alternate embodiment includes a make-before-break element in parallel with the switches. The passive break-before-make element, or make-before-break element, provides a high impedance in a short term and a low impedance in a long term. The switching circuit may be coupled to a load through a low pass filter. In one embodiment, the switching circuit is used in a switching audio amplifier circuit, where correction of nonlinearities incorporates analog feedback to modify the duty ratio of a digitally generated switching signal in the analog domain.

29 Claims, 7 Drawing Sheets

SWITCHING CIRCUIT AND METHOD THEREFOR

This is a divisional of U.S. patent application Ser. No. 09/477,985 filed on Jan. 20, 2000.

RELATED APPLICATIONS

This is related to Midya et al., U.S. patent application Ser. No. 09/478,024, entitled "Circuitry for Converting a Sampled Digital Signal to a Naturally Sampled Digital Signal and Method Therefor," and Midya et al., U.S. patent application Ser. No. 09/478,013, entitled "Apparatus for Noise Shaping a Pulse Width Modulation (PWM) Signal and Method Therefor," both filed on even date herewith, and are incorporated herein by reference.

The is also related to U.S. patent application Ser. No. 09/307,453, filed May 7, 1999, and entitled "Method and Apparatus for Producing a Pulse Width Modulated Signal" and is incorporated herein by reference and assigned to the current assignee hereof.

FIELD OF THE INVENTION

The present invention relates generally to switching circuits, and more specifically to switching circuits containing passive break-before-make or make-before-break elements, and to correction of nonidealities of the switching circuit operating on a digital switching signal.

RELATED ART

FIG. 1A illustrates switching circuit 10 which is an example of a switching circuit commonly used in the art. A first terminal of switch 16 and a first terminal of diode 17 are coupled to V+ node 12, and a second terminal of switch 16 and a second terminal of diode 17 are coupled to passive LC filter 20, a first terminal of switch 18, and a first terminal of diode 19. A second terminal of switch 18 and a second terminal of diode 19 are coupled to V− node 14 (where V− node 14 may be a ground node). Passive LC filter 20 is further coupled to a first terminal of load 22, and the second terminal of load 22 is coupled to ground. Switches 16 and 18 are implemented with high power transistors. Input signal $q_p(t)$ 24 controls switch 16, while input signal $q_n(t)$ 26 controls switch 18. Both signals 24 and 26 are square waves used to control the switches. However, since high power transistors are used as switches 16 and 18, a significant portion of the time is spent in the switches' transitions. This leads to the problem that both switches 16 and 18 may either be open or closed at the same time. If they are both closed at the same time, a short circuit path from V+ to V− is created thereby causing excess power dissipation. If both switches 16 and 18 are open and diodes 17 and 19 are not present, passive LC filter 20 no longer receives a current path which causes a voltage stress and non-linearity in the circuit. Therefore, one prior art solution includes adding a dead time to signal 24 as shown in FIG. 1B. Alternatively, a dead time may be added to signal 26.

FIG. 1B illustrates a $t_{dead}$ delay time which prevents signals 24 and 26 from being on at the same time. However, this solution is undesirable because a current path must be created for the time $t_{dead}$ when both switches are off. This situation adds extra elements and signal lines to circuit 10. These extra elements include diodes 17 and 19 which are placed in parallel with switches 16 and 18, respectively, to provide the necessary current path. However, these diodes are non-linear elements which cause distortion and non-linearity in switching circuit 10. Therefore, a need exists to find a solution for a switching circuit that removes the extra elements and provides a more linear circuit. Furthermore, since a dead time must be introduced to either signal 24 or 26, two separate gate drivers are needed to drive switches 16 and 18 which adds more elements and inputs to the circuit, thereby increasing the cost.

FIG. 2 illustrates another prior art solution to switching circuit 10. FIG. 2 illustrates switching circuit 28 which uses only one gate driver 30 whose output is coupled to a first terminal of resister 32, a first terminal of diode 36, a first terminal of resistor 34, and a first terminal of diode 38. A second terminal of diode 36 and a second terminal of resistor 32 are coupled to the gate of a PMOS transistor 40. A second terminal of resistor 34 and a second terminal of diode 38 are coupled to the gate of NMOS transistor 42. The drain of PMOS transistor 40 is coupled to the drain of NMOS transistor 42 and coupled to a first terminal of low pass filter 44. The source of PMOS transistor 40 is coupled to node V+, while the source of NMOS transistor 42 is coupled to node V− (where V− may be a ground node). A second terminal of low pass filter 44 is coupled to a first terminal of load 46, and a second terminal of load 46 is coupled to ground.

In this case, resistors 32 and 34 work with the gate-to-source capacitances of transistors 40 and 42, respectively, to introduce a delay in the gate to source voltages. Diodes 36 and 38 guarantee that this delay is introduced in only one direction and not the other. This solution, therefore, provides the required dead time analogous to $t_{dead}$ of FIG. 1B. However, diodes 36 and 38 are non-linear elements which introduce non-linearity into circuit 28, and the switching time of transistors 40 and 42 are slowed down thus introducing greater dissipation.

Additionally, often digital sampling is used to generate signals used in switching circuits. The sampling process and the switching process introduce disturbances into applications, such as power generation, amplification and control, reducing the accuracy of the output signal. In digital audio applications, the power supply and nonlinearities in the switches introduce harmonic distortion, corrupting the output audio signal.

Therefore, a need exists for a switching circuit with a more linear switching transition while maintaining high efficiency and low cost. Additionally, a need exists for correction of nonidealities of the switching circuit operating on a digital switching signal.

BRIEF DESCRIPTION OF THE DRAWINGS

The present invention is illustrated by way of example and not limitation in the accompanying figures, in which like references indicate similar elements, and in which.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION

As used herein, passive elements refer to elements such as resistors, capacitors, and inductors. Switches are considered on when they are closed and form a connection, and they are considered off when they are open or break a connection. Also, nodes V+ and V− refer to terminals where the voltage at V+ is greater than the voltage at V−. In some embodiments, node V− may be a ground node. Furthermore, although specific conductivity types or polarity of potentials are being used, skilled artisans will appreciate that conductivity types and polarities of potentials may be reversed.

Figure 3:
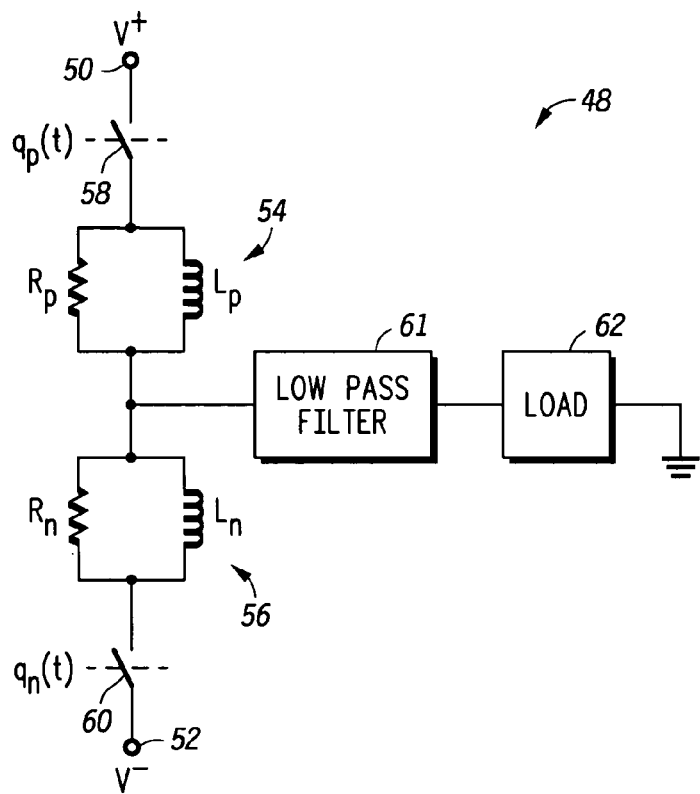
FIG. 3 illustrates a switching circuit in accordance with one embodiment of the present invention.

FIG. 3 illustrates switching circuit 48 in accordance with one embodiment of the present invention. Node V+ 50 is coupled to a first terminal of switch 58. A second terminal of switch 58 is coupled to a first terminal of break-before-make (BBM) element 54, and the second terminal of BBM element 54 is coupled to the first terminal of BBM element 56 and a first terminal of low pass filter 61. A second terminal of low pass filter 61 is coupled to a first terminal of load 62, and a second terminal of load 62 is coupled to ground. The second terminal of BBM element 56 is coupled to a first terminal of switch 60, and the second terminal of switch 60 is coupled to node V− 52. BBM element 54 includes a resistor $R_p$ in parallel with an inductor $L_p$, and BBM element 56 includes a resistor $R_n$ in parallel with inductor $L_n$. Therefore, BBM elements 54 and 56 are considered passive BBM elements. In one embodiment of the present invention, switch 58 is a high power PMOS transistor, while switch 60 is a high power NMOS transistor. Input signals $q_p(t)$ and $q_n(t)$ are used to control switches 58 and 60 respectively.

Figure 1A:
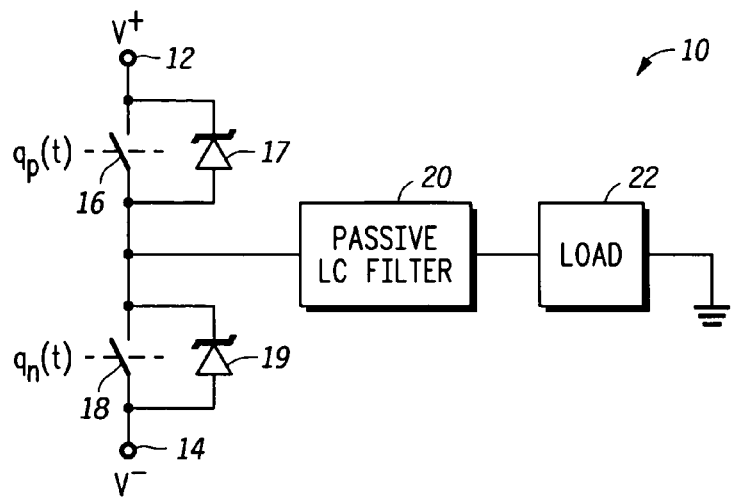
FIG. 1A illustrates a switching circuit currently used in the art.
Figure 1B:
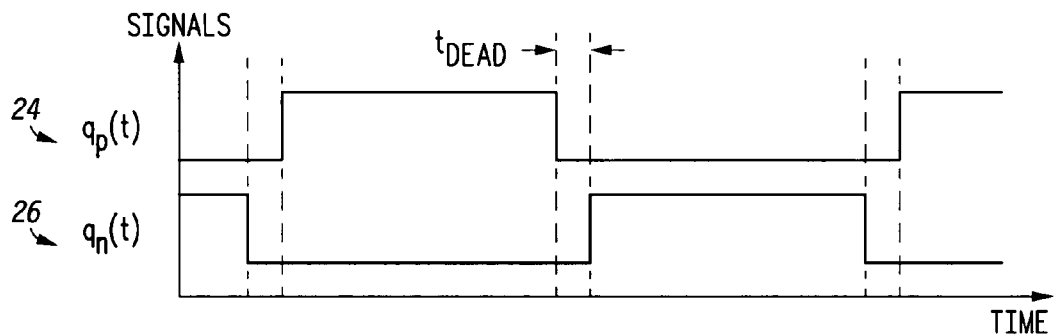
FIG. 1B illustrates input signals used to control the switches of the switching circuit in FIG. 1A.
Figure 2:
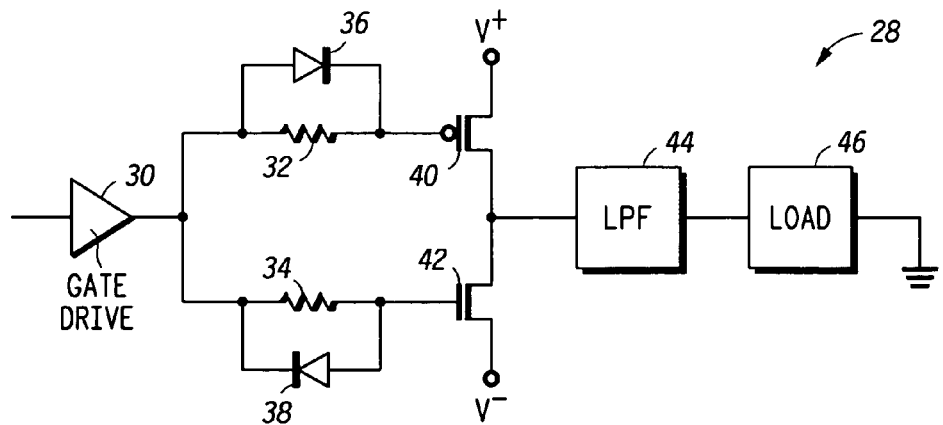
FIG. 2 illustrates a second switching circuit currently used in the art.

In operation, due to the presence of BBM elements 54 and 56, signals $q_p(t)$ and $q_n(t)$ may be the same signal out of a gate drive output. This allows for the use of a single gate driver for both switches 58 and 60. As was described above in reference to FIG. 1A, since high power transistors used as switches 58 and 60 have a significant switching time, a short circuit path can be created between nodes 50 and 52 when both switches are turned on. BBM elements 54 and 56, therefore, work to limit the current through the short circuit path. Most of the time, current flows through either inductor $L_p$ or inductor $L_n$ depending upon which switch 58 or 60 is turned on. However, during the switch transition times when both switches 58 and 60 are on, the current flows through $R_p$ and $R_n$ due to the fact that the inductors $L_p$ and $L_n$ reject fast changing currents. Therefore, BBM elements 54 and 56 provide a proper current path for low pass filter 61 during the switching transitions. Since low pass filter 61 needs to see a current path at all times, resistors $R_p$ and $R_n$ ensure that a current path exists even during switching transitions.

The values of resistors $R_p$ and $R_n$ and inductors $L_p$ and $L_n$ are chosen such that a sufficient time constant of L/R is provided during the switching transitions. The values of $R_p$, $R_n$, $L_p$, and $L_n$ are also chosen to minimize the switching stress on switches 58 and 60. Furthermore, the resistors and inductors of BBM elements 54 and 56 are linear passive elements which do not introduce non-linearity during the switching transitions. Passive BBM elements 54 and 56, by reducing non-linearity, reduce distortion caused by the switching transitions that is seen by low pass filter 61 and load 62. These BBM elements 54 and 56 allow for reduced numbers of parts and components, reduced signal lines, reduced costs, and improved linearity. For example, in one embodiment of the present invention, switching circuit 48 may be used for a digital audio amplifier wherein improved linearity is an important element.

Alternate embodiments may include different elements within the passive BBM elements or may include only one BBM, as opposed to two as illustrated in FIG. 3. The BBM elements discussed throughout herein are designed to have a relatively high impedance during short terms and low impedance during long terms. That is, the short terms refer to the switching transitions where the current changes rapidly, and the long terms refer to those times, other than the switching times, where the current remains fairly constant. Furthermore, these BBM elements reduce electromagnetic interference (EMI) by limiting the rate of change of the current taken from the power supply. Therefore, the EMI concerns of the switching circuit are reduced or eliminated. Also, alternate embodiments may use PNP transistors in place of the PMOS transistors and NPN transistors in place of the NMOS transistors as the switches. Alternatively, other semiconductor switching elements may be used as the switches.

Figure 4:
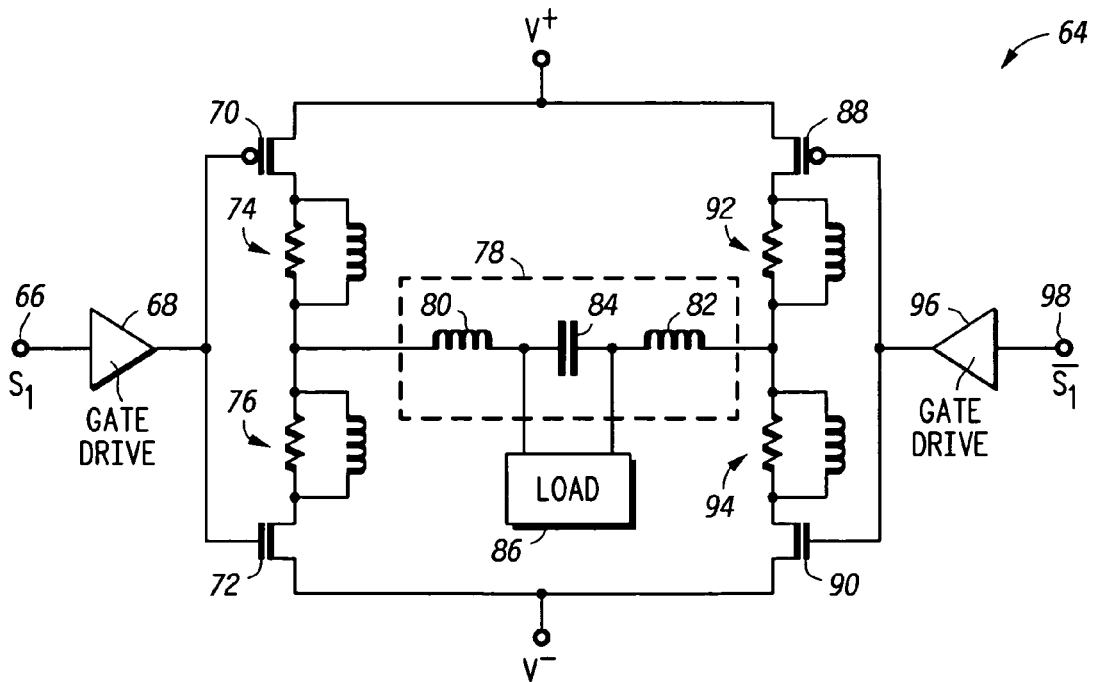
FIG. 4 illustrates a push-pull switching circuit in accordance with one embodiment of the present invention.

FIG. 4 illustrates a push-pull system using passive BBM elements in accordance with one embodiment of the present invention. Push-pull switching circuit 64 includes four switches 70, 72, 88, and 90, and four BBM elements 74, 76, 92, and 94. Input signal $S_1$ 66 is input to gate driver 68 whose output is coupled to switches 70 and 72. The output of gate drive 68 is coupled to the gate of PMOS transistor 70 and the gate of NMOS transistor 72. The source of PMOS transistor 70 is coupled to node V+ and the source of NMOS transistor 72 is coupled to node V−. The drain of PMOS transistor 70 is coupled to a first terminal of BBM element 74, and the second terminal of BBM element 74 is coupled to a first terminal of low pass filter 78 and a first terminal of BBM element 76. The second terminal of BBM element 76 is coupled to the drain of NMOS transistor 72. Input signal S₁_bar 98, the inverse of signal S₁ 66, is input to gate driver 96 whose output is coupled to switches 88 and 90. The output of gate drive 96 is coupled to the gate of PMOS transistor 88 and the gate of NMOS transistor 90. The source of PMOS transistor 88 is coupled to node V+ and the source of NMOS transistor 90 is coupled to the node V−. The drain of PMOS transistor 88 is coupled to a first terminal of BBM element 92, and the second terminal of BBM element 92 is coupled to a second terminal of low pass filter 78 and a first terminal of BBM element 94. The second terminal of BBM element 94 is coupled to the drain of NMOS transistor 90.

Low pass filter 78 is coupled to load 86. Low pass filter 78 includes inductor 80, capacitor 84, and inductor 82. A first terminal of inductor 80 is coupled to the second terminal of break before make element 74 and the first terminal of break before make element 76. The second terminal of inductor 80 is coupled to a first terminal of load 86 and a first terminal of capacitor 84. The second terminal of capacitor 84 is coupled to a second terminal of load 86 and a first terminal of inductor 82. The second terminal of inductor 82 is coupled to the second terminal of make before break element 92 and the first terminal of make before break element 94.

In operation, switching circuit 64 of FIG. 4 is a push-pull version of switching circuit 48 of FIG. 3. The push-pull version 64 uses the symmetry between PMOS transistors 70 and 88 and NMOS transistors 72 and 90 to increase the linearity of the system. As explained with reference to FIG. 3, in switching circuit 64 only one gate driver 68 is necessary to control both switches 70 and 72, and only one gate driver 96 is required to control both switches 88 and 90. This eliminates the need for a separate gate driver for each switch as used in the prior art (for example, see FIG. 1A). In one embodiment of the present invention, switching circuit 64 may be used in a digital audio amplifier system. In a digital audio amplifier system, input signals S₁ 66 and S₁_bar 98 are received from a digital signal processor. Therefore, switching circuit 64, by reducing the number of gate drivers and input signals required, reduces the number of pins needed on a digital signal processor.

Once again, in order to reduce distortion, low pass filter 78 prefers to see a current path at all times; therefore, the resistors of the BBM elements provide a current path at all times including during the switch transitions. The values of the resistors and inductors of the BBM elements are chosen based upon the impedance of the load and the switching transition characteristics of transistors 70, 72, 88, and 90. In one embodiment, the inductors of the BBM elements are chosen to be 43 nanohenries and the resistors of the BBM elements are chosen to be 10 ohms when the load is 8 ohms and the supply voltage is 20 volts. However, alternate embodiments may choose different values for the inductors and the resistors based upon different loads and supply voltages and different characteristics of transistors 70, 72, 88, and 90, and switching circuit 64.

An alternate embodiment of switching circuit 64 may be designed without BBM elements 74 and 92. Alternatively, switching element 64 may be designed without BBM elements 76 and 94. In this manner, switching circuit 64 may include only two BBM elements rather than four. Also, alternate embodiments may place the BBM elements between the voltage nodes V+ or V− and the sources of the transistors.

Figure 5:
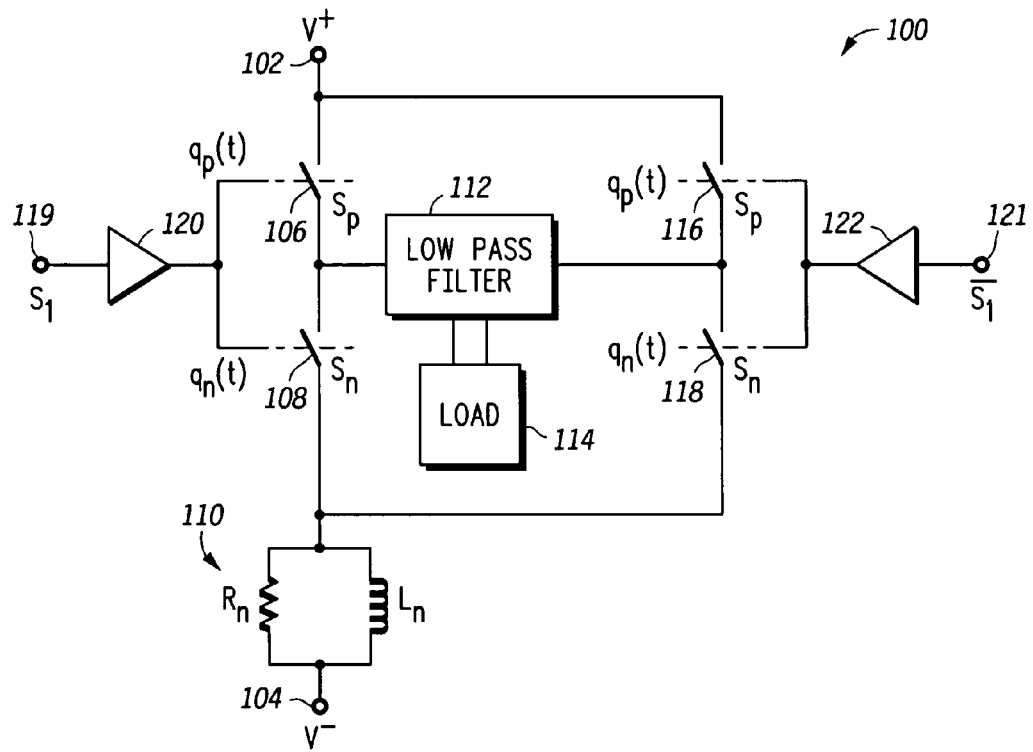
FIG. 5 illustrates a simplified version of the push-pull switching circuit of FIG. 4 in accordance with another embodiment of the present invention.

FIG. 5 illustrates an alternate embodiment of switching circuit 64 illustrated in FIG. 4. FIG. 5 illustrates push-pull switching circuit 100 which includes switches 106, 108, 116, and 118, low pass filter 112, and BBM element 110. V+ node 102 is coupled to a first terminal of switch 106 and a first terminal of switch 116. The second terminal of switch 106 is coupled to a first terminal of low pass filter 112 and a first terminal of switch 108. The second terminal of switch 116 is coupled to a second terminal of low pass filter 112 and a first terminal of switch 118. The second terminal of switch 108 and the second terminal of switch 118 is coupled to a first terminal of make before break element 110, and the second terminal of make before break element is coupled to node V− 104. Low pass filter 112 is coupled to load 114. As in FIG. 4, a signal S₁ 119 is input to gate driver 120 whose output is coupled to switches 106 and 108. Signal S₁_bar 121, the inverse of signal S₁ 119, is input to gate drive 122 whose output is coupled to switches 116 and 118. Also, as in FIG. 4, switches 106 and 116 may be high power PMOS transistors while switches 108 and 118 may be high power NMOS transistors wherein the output of drivers 120 and 122 are coupled to the gates of the transistors.

In operation, push-pull switching circuit 100 of FIG. 5 is a modified version of switching circuit 64 of FIG. 4 that maintains the BBM action while using a reduced number of parts. To reduce the number of parts in the push-pull circuit 64, the four BBM elements of FIG. 4 (74, 76, 92, and 94) have been reduced into a single BBM element 110. Furthermore, BBM element 110 may be placed between V+ node 102 and the first terminals of switches 106 and 116 rather than between node V− 104 and the second terminals of switches 108 and 118. Single BBM element 110 is designed to provide the same advantages as the four BBM elements of FIG. 4. Once again, resistor $R_n$ of BBM element 110 provides a current path at all times, including the switching transitions, to low pass filter 112. Therefore, switching circuit 100 is a simplified circuit that maintains efficiency.

Figure 6:
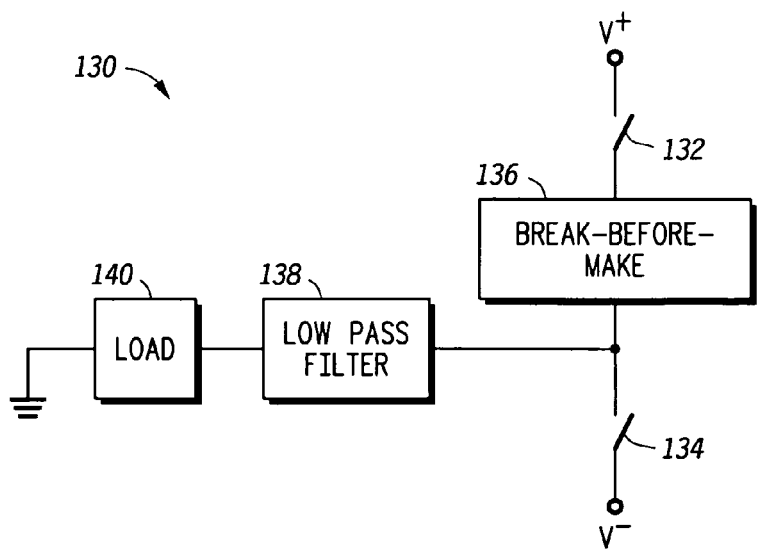
FIG. 6 illustrates the use of a break-before-make element in combination with two switches in accordance with one embodiment of the present invention.

FIG. 6 illustrates the basic structure of a switching circuit containing a BBM element in accordance with one embodiment of the present invention. Node V+ is connected to a first terminal of switch 132, and the second terminal of switch 132 is coupled to a first terminal of passive BBM element 136. A second terminal of passive BBM element 136 is coupled to a first terminal of low pass filter 138 and a first terminal of switch 134. The second terminal of switch 134 is coupled to ground, and a second terminal of low pass filter 138 is coupled to a first terminal of load 140 where a second terminal of load 140 is coupled to ground. Once again, BBM element 136 ensures that there is a current path available to low pass filter 138 at all times including during the switching times of switches 132 and 134. Since BBM element 136 includes passive linear elements (i.e. resistors, inductors, and/or capacitors), BBM element 136 does not introduce any non-linearity during the switching transitions. Furthermore, BBM element 136 may be placed at any point between nodes V+ and V−. For example, BBM element 136 may be placed between the node V+ and the first terminal of switch 132 or between V− and the second terminal of switch 134.

Figure 7:
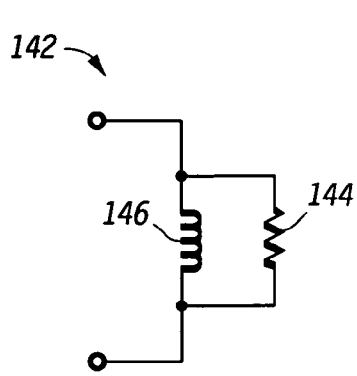
FIG. 7 illustrates a passive break-before-make element in accordance with one embodiment of the present invention.

FIG. 7 illustrates one embodiment of a BBM element in accordance with one embodiment of the present invention. For example, BBM 142 may be used for BBM 136 in FIG. 6. BBM element 142 is a passive BBM element that includes inductor 146 coupled in parallel with resistor 144. In operation, during the transition times of the switches within a switching circuit, the current flows through resistor 144. However, during the other times the current will flow through inductor 146. As was described above, BBM 142 is designed such that a high impedance exists for the short term (such as during the transitions) and a low impedance for the long term (such as the times surrounding the transitions).

Figure 8:
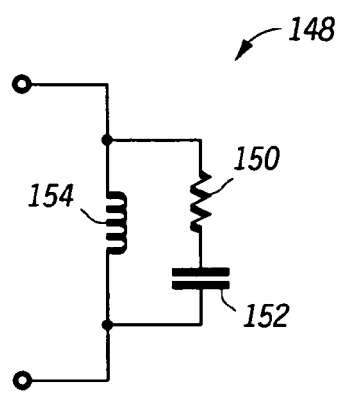
FIG. 8 illustrates a passive break-before-make element in accordance with another embodiment of the present invention.

FIG. 8 illustrates a passive BBM element in accordance with an alternate embodiment of the present invention. Passive BBM element 148 may also be used in place of BBM 136 in FIG. 6 and includes inductor 154 coupled in parallel with resistor 150 that is in series with capacitor 152. The presence of capacitor 152 reduces the dissipation during the transition times when current is flowing through resistor 150 and capacitor 152. Furthermore, the LC time constant may be chosen to be resonant with the switching transition time. Therefore, the values of inductor 154, resistor 150, and capacitor 152 are chosen to provide the proper time constant. BBM elements 142 of FIG. 7 and 148 of FIG. 8 both improve efficiency and linearity of switching circuits while reducing input lines, number of components, and dissipation.

Figure 9:
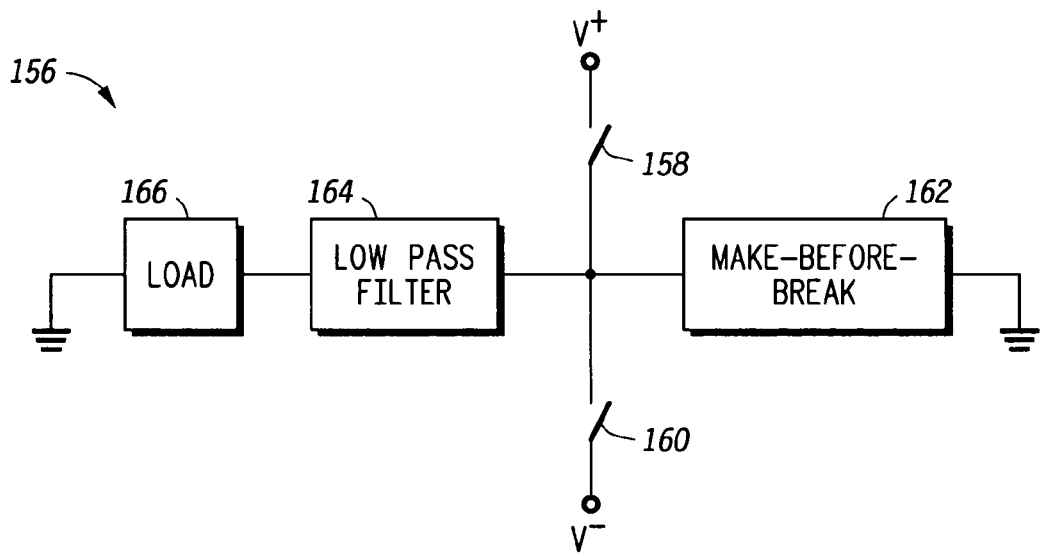
FIG. 9 illustrates a make-before-break element used in combination with two switches in accordance with one embodiment of the present invention.

FIG. 9 illustrates a switching circuit utilizing a make-before-break (MBB) element in accordance with one embodiment of the present invention. Switching circuit 156 illustrates the mathematical converse or inverse of switching circuit 130 of FIG. 6. In this transformation, for example, inductors become capacitors and connections in series become connections in parallel. Switching circuit 156 includes load 166, low pass filter 164, switches 158 and 160, and MBB element 162. Node V+ is connected to a first terminal of switch 158, and the second terminal of switch 158 is coupled to a first terminal of low pass filter 164, a first terminal of switch 160, and a first terminal of MBB element 162. The second terminal of switch 160 is coupled to node V−, and the second terminal of MBB element 162 is coupled to ground. A second terminal of low pass filter 164 is coupled to a first terminal of load 166, and the second terminal of load 166 is coupled to ground. Switching circuit 156 is designed such that switches 158 and 160 will never be turned on simultaneously. However, they may be turned off simultaneously, thus creating an open circuit between V+ and V−. During this time, MBB element 162 provides a current path to low pass filter 164. Therefore, MBB 162 ensures that low pass filter 164 will have a current path at all times, analogous to the function of the BBM elements described herein above.

Figure 10:
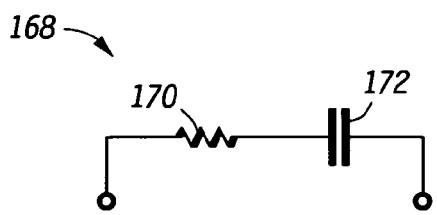
FIG. 10 illustrates a make-before-break element in accordance with one embodiment of the present invention.

FIG. 10 illustrates a MBB element 168 in accordance with one embodiment of the present invention. For example, this MBB may be used in switching circuit 156 of FIG. 9. MBB element 168 includes resistor 170 coupled in series with capacitor 172. As described above, during the times when both switches 158 and 160 are open, capacitor 172 provides a current path to low pass filter 164. The passive MBB elements described above provide similar advantages to the passive BBM elements described above. For example, the MBB elements also provide a current path in the short term, reduce cost, improve efficiency, and reduce or eliminate EMI concerns.

Therefore, it can be appreciated how the above embodiments illustrate switching circuits using BBM and MBB elements that improve linearity, reduce the number of components and input signals required, reduce cost, and improve efficiency over known techniques. For example, in one embodiment, these switching circuits may be used in a digital audio application to provide the above advantages. In this embodiment, the load may be a speaker, and the reduction in the number of input signals required may simplify connection of the switching circuit to a digital signal processor. Furthermore, the switching circuits described above may be composed of discrete components found on a circuit board or may be designed as integrated circuit chips. Also, alternate embodiments may not include a low pass filter coupled between the switches and the load. That is, filter 61 of FIG. 3, filter 78 of FIG. 4, filter 112 of FIG. 5, filter 138 of FIG. 6, and filter 164 of FIG. 9 may be removed from the circuits. Alternatively, other filters may be used. Furthermore, the loads (for example, load 62, load 86, load 114, load 140, or load 166) may be any appropriate load, such as a speaker.

Switching circuits are used in a variety of applications, including power, control and amplification applications. For example, in a digital audio amplification application, large audio waveforms are used to drive audio speakers. The audio wave form is generated by a digital PWM signal switching a high voltage power supply. Digital sampling is used to generate the PWM signal used for power switching, where a digital signal processor (DSP) is generally used to generate the PWM signal. Typically, the digital PWM signal will have an accuracy defined to be 16–20 bits depending on the input source. The audio output waveform is affected by noise in the power supply and nonlinearities introduced at the power stage. The nonidealities may result from switch nonlinearities, break-before-make, make-before-break, or nonidealities of the power supply. The nonlinearities result in harmonic distortion. In practice the harmonic distortion is typically in the range of about 60 dB total harmonic distortion (THD).

In addition to non-linearities introduced by the power switches in the power stage, other noise may be generated within the power supply. Interference generated by other channels within the digital audio amplification system also tend to disturb the PWM output at the power switches.

It is desirable to compensate for such distortions introduced during the power stage. One solution is to implement high speed switches within the power stage and thus reduce some of the distortion in the output wave form, however, this greatly increases the cost of the application and is typically not suited for high volume production. Another solution uses pulse density modulation (PDM) which is typically easy to control, however, PDM has a variable switching frequency which is not suited for applications involving radio reception.

Embodiments of the present invention provide small adjustments to the digital PWM signal, which correct for these various disturbances without requiring a resampling of the PWM signal. The output of the power stage is provided to an integral feedback circuit to suppress the switching frequency while providing sufficient gain within the pass band of the system to improve linearity. One embodiment of the present invention increased the quality of the output audio waveform to 70 dB.

In practice, a typical digital audio amplification system receives a signal from a digital source, such as a compact disk (CD), which is provided to a conversion block. The digital source is typically encoded using pulse code modulation (PCM). It is desirable to convert the PCM signal to a PWM signal. The output of the PCM to PWM conversion is then provided to a Class-D amplifier. The output of the amplifier is then put through an LC low pass filter and provided to the load, which in this case is typically a speaker.

A Class-D amplifier may be either half bridge or full bridge with switches driven either by the PWM signal, its compliment, or a modification thereof. Typically these switches are power MOSFETS or BJT's. All of the typical switches are non-linear devices, introducing distortion into the audio information. Within such a system the first distortion is introduced during the PCM to PWM conversion, so the Class-D amplifier receives an already distorted signal.

As the switches are not ideal and large currents are typically involved in an amplification at this power stage, the output of the power stage includes various non-linearities. Typical power stages also exhibit very low power supply rejection, meaning that any interference present on the supply rails during the amplification process will appear at the output as well. Other channels within the digital audio amplification system have an additional impact on such distortions. One solution to reducing cross talk between channels is the use of separate power supplies, however this is a costly solution.

In one aspect of the present invention, a method for correcting small non-linearities created in the power stage of an audio amplifier, introduced by the switching operation, uses analog feedback to generate a power stage output waveform that is an accurate replica of the original input PWM signal, i.e. free from processing distortions. The analog feedback is used to modulate the duty ratio of the original input PWM signal. The method provides power supply noise rejection, which in turn reduces crosstalk between channels. Within an audio amplification application, such as a digital audio amplifier, each channel is a separate amplification path. For example, a first channel is a path to a first stereo speaker and a second channel is a path to a second speaker. In one embodiment of the present invention, a duty ratio modulator is used to adjust input PWM signals.

Throughout this discussion the term "PWM signal" or "PWM input" will be used to refer to the signal being processed throughout a system. The PWM signal is defined by magnitude and duty ratio, which may change throughout processing due to various distortions introduced by the process. The edges of the pulses in the adjusted PWM signal are delayed with respect to the input PWM signal, and the duty ratio of the signal is adjusted with respect to the output voltage of the power stage.

Figure 11:
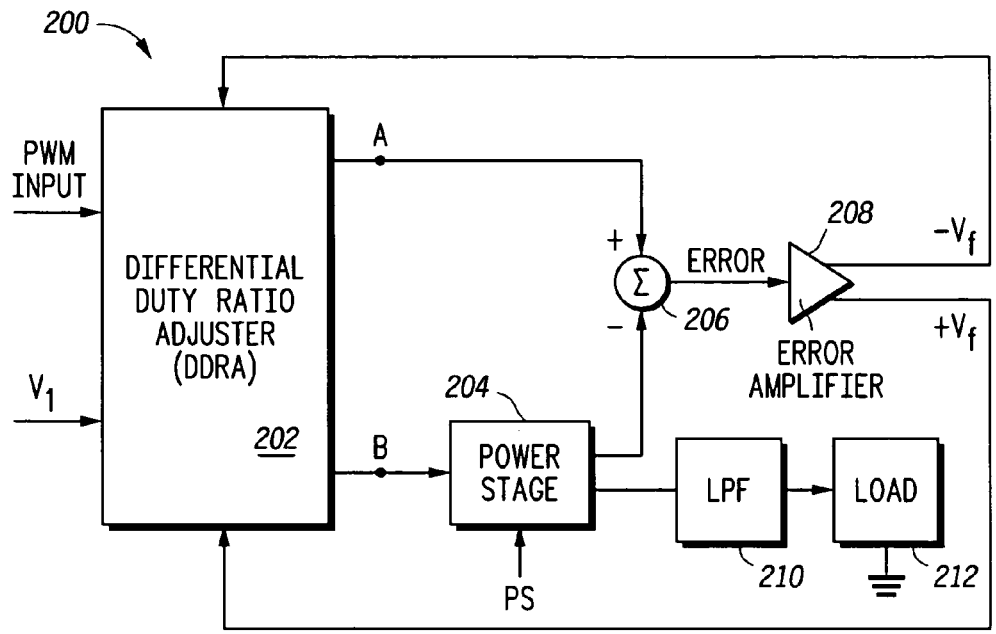
FIG. 11 illustrates a circuit to provide analog feedback using a differential duty ratio adjuster in accordance with one embodiment of the present invention.

One embodiment of a power stage having a switching circuit with feedback 200 is illustrated in FIG. 11, where a Differential Duty Ratio Adjuster (DDRA) 202 receives a PWM input and a first control voltage, $V_1$. The DDRA 202 has a first output corresponding to point B, which is provided to a power stage 204. Power stage 204 is powered by large power supply, which is often used to power multiple amplifiers within a given system. The PWM signal of point B controls the switching of elements within the power stage 204. The power stage amplifies the PWM signal, and provides an amplified PWM signal to a low pass filter (LPF) 210 and to a summing node 206. The filtered output of LPF 210 is provided to load 212. The DDRA 202 has a second output corresponding to point A, which is provided to a summing node 206. The output of power stage 204 is subtracted from the output of node A. In this way, the output of the power stage is compared to a clean PWM signal, and the difference is used to generate integrated feedback. The resultant difference of summing node 206 is provided to an error amplifier 208, where it is amplified such that it realizes a high gain at audio frequencies and a low gain at the switching frequency.

The error amplifier 208 includes an integrator to generate an amplified error signal, voltage $V_f$ that is provided to DDRA 202. The amplified error signal provides feedback information to the DDRA 202 which is used to adjust the duty ratio of the PWM signal. In one embodiment of the present invention, error amplifier 208 generates ($V_f$) and its compliment ($-V_f$), where both are provided as feedback to DDRA 202. DDRA 202 adjusts the duty ratio of the PWM input signal, and balances the delay between the two paths going to summing node 206.

Figure 12A:
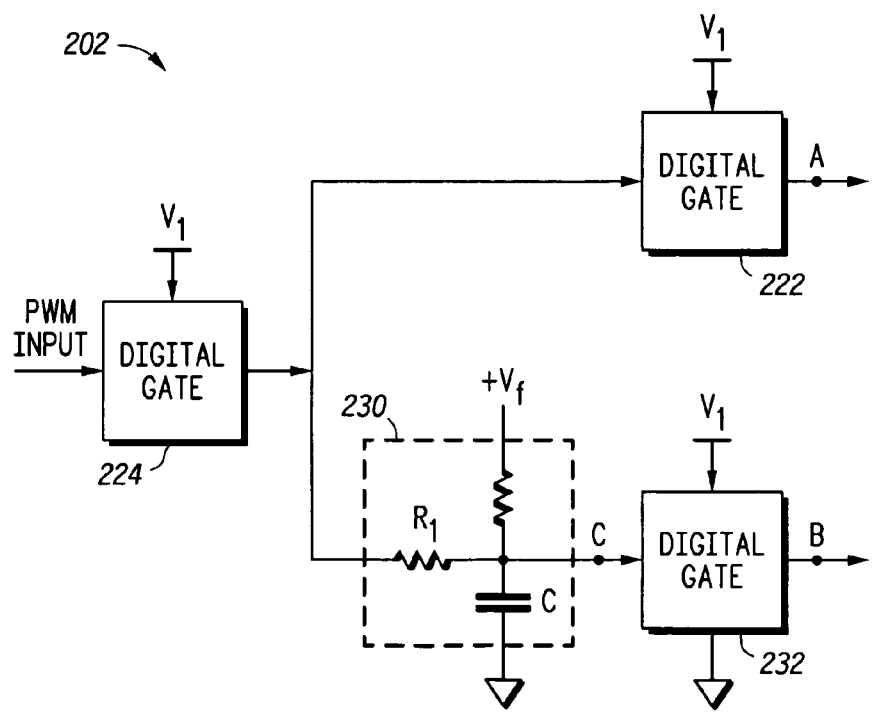
FIG. 12A illustrates a circuit implementation of the duty ratio adjuster in accordance with one embodiment of the present invention.

One embodiment of DDRA 202, illustrated in FIG. 12A, provides the PWM input signal to a digital gate 224, the output of which is provided to digital gate 222 and to duty ratio modulator 230. The digital gate 224 reduces extraneous noise in the PWM input. The digital gate 224 acts as a digital receiver and repeats the high and low signals without the noise. Duty ratio modulator 230 receives the error amplifier signal $V_f$ from error amplifier 208, as illustrated FIG. 11. The output of the duty ratio modulator 230 is then provided to a digital gate 232. A control voltage, $V_1$, controls the amount of delay for the digital gate 232. The output of digital gate 232 is then provided to power stage 204.

While duty ratio modulator 230 introduces a delay into the PWM signal, the upper path illustrated in FIG. 12A compensates for that delay. The digital gate 222 introduces a compensatory delay prior to summing node 206. Digital gate 222 also receives a consistent control voltage, $V_1$. In one embodiment, a low noise power supply generates $V_1$ throughout switching circuit 200. The control voltage, $V_1$, is provided by a separate power supply from that supplying the power stage 204. The digital ratio modulator 230 replicates the original input PWM signal which has been distorted by digital processing. Within duty ratio modulator 230, the PWM signal is initially smoothed by resistor R1 and capacitor C, where the output edge transitions are slowed. The result is a replica of the original undistorted PWM input with extended rise times and fall times. Digital gate 232 functions as a comparator having a fixed threshold voltage, $V_T$.

Figure 13:
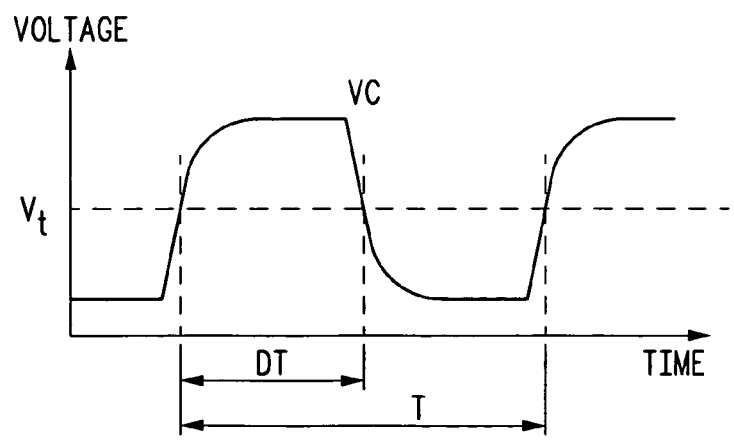
FIG. 13 illustrates the waveform at the output of the duty ratio adjuster in accordance with one embodiment of the present invention.

The output of digital gate 232 is illustrated in FIG. 13, where D corresponds to the duty ratio of the power stage, and T corresponds to the period. The duty ratio at the output of digital gate 232 is given as DT/T, which is equal to D. This is provided as input to power stage 204. The rising and falling edges of the resultant signal are delayed and sloped. The magnitude of the signal may increase or decrease with respect to $V_T$. The amplified error signals $V_f$ and its complement ($-V_f$) are used to shift the signal up and down, effectively self-correcting the duty ratio D based on the output of the power stage 204.

Referring again to FIG. 11, in cases where non-linearities and switching effects within power stage 204 result in a higher power stage 204 output than a an average value, the error signal provided to error amplifier 208 will decrease. A reduced error signal input to error amplifier 208 results in a reduced amplified error output. A corresponding reduction in the entire signal is seen at point C of FIG. 12A, where the duty ratio, D, will decrease slightly. In response, the output of power stage 204 will return to a correct value.

Embodiments of the present invention provide a high power supply rejection (PSRR) that reduces the crosstalk between channels within an amplification system. Error amplifier 208 is designed such that the integrator behavior acts as a low pass filter having a bandwidth sufficient for an audio band but which rejects the switching frequency.

Figure 12B:
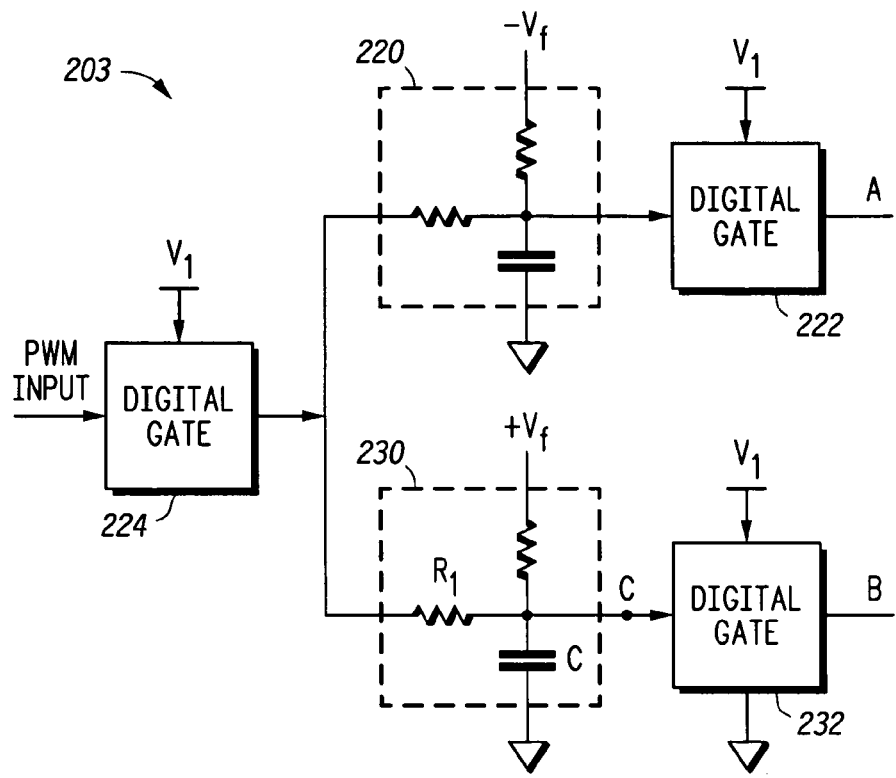
FIG. 12B illustrates a circuit implementation of the differential duty ratio adjuster in accordance with one embodiment of the present invention.

An alternate embodiment of the present invention is illustrated in FIG. 12B, where the DDRA 203 is similar to the DDRA 202 of FIG. 12A with an additional second duty ratio modulator 220 coupled between digital gate 224 and digital gate 222. Again, digital gate 222 and digital gate 232 both receive voltage $V_1$. The duty ratio modulator 220 is added to compensate for delays introduced by duty ratio modulator 230. As duty ratio modulator 230 introduces a delay in the PWM signal in the path of node B, it is duplicated in the reference path of node A to repeat the same delay. Feedback information is provided to duty ratio modulator 230 by $V_f$, while its complement, ($-V_f$) is provided to duty ratio modulator 220. The amplified error signals adjust the duty ratio of the PWM signal, where $V_f$ and $(-V_f)$ have opposite effects on the duty ratio of the PWM signal, reducing the difference seen at summing node 206. Each of the modulators 220 and 230 include RC circuit elements which introduce a same delay into each path. In this way the delay between the two signals received at summing node 206 is minimized.

FIG. 13 illustrates the voltage seen at capacitor C within duty ratio modulator 230. As illustrated, time is represented on the horizontal axis, while the voltage $V_C$ is represented on the vertical axis. The threshold voltage $V_T$ is given as a fixed voltage level. T corresponds to the period of the signal, and the pulse width of the signal is defined as the product of the duty ratio, D, and the period, T. As illustrated both the rising edge and the falling edges are sloped. Increasing the output of error amplifier 208, $V_f$, tends to raise the entire $V_C$ signal. Similarly, $V_C$ decreases with decreasing $V_f$.

Figure 14:
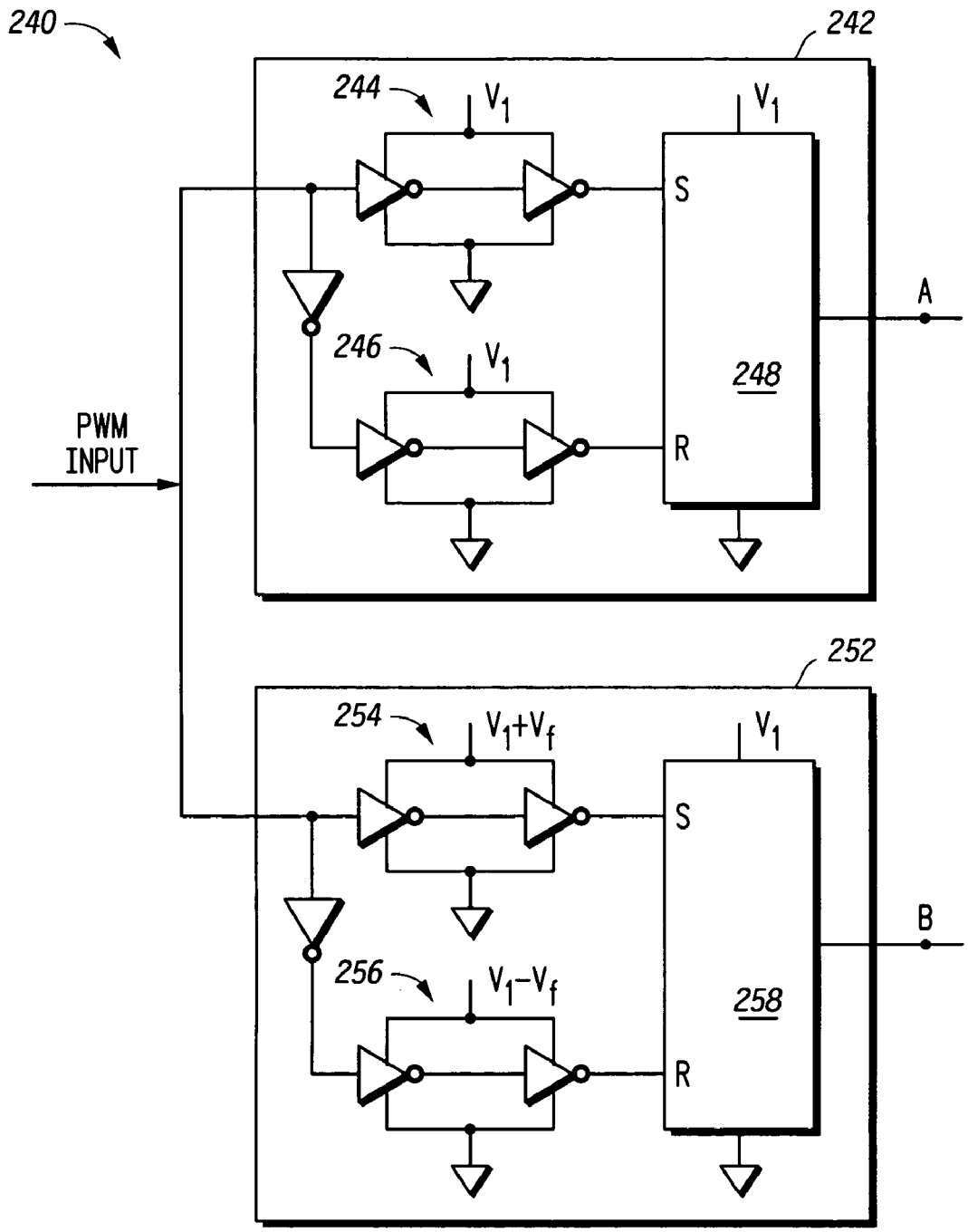
FIG. 14 illustrates a circuit implementation of the differential duty ratio adjuster suitable for implementation in an integrated circuit.

An alternate embodiment of DDRA 202, as illustrated in FIG. 11, is provided in FIG. 14. Here DDRA 240 receives a PWM input signal and channels it to two paths. A first path provides the PWM signal to block 252 to generate the clean PWM signal, while a second path provides the PWM signal to block 242 for duty ration adjustment. The output of block 242 corresponds to point A as indicated in FIG. 11. Similarly the output of block 252 corresponds to point B as indicated in FIG. 11.

Block 242 includes two parallel delay lines comprising of logic gates circuits 244 and 246. The PWM signal is an input to circuit 244, while the inverted PWM is an input to circuit 246. Circuit 244 provides an S input to latch 248, while integration circuit 246 provides an R input to latch 248. Here S and R represent set and reset respectively. The latch 248 is not clocked. The output transitions are governed entirely by the inputs S and R. Delay circuit 244 receives control voltage signal $V_1$, where two integrators are coupled in tandem. Delay circuit 246 is configured to have an additional inversion at its input since it feeds the reset node of the S-R latch.

Block 252 is similar to block 242, having delay circuits 254 and 256, each providing input signals S and R, respectively, to latch 258. Circuit 254 receives the PWM signal, while circuit 256 receives the inverted PWM signal. The latch 258 is not clocked. It toggles according to the inputs S and R. In block 252, integration circuit 254 receives the sum of $V_1$ plus $V_f$. Integration circuit 256 receives the difference of $V_1$ and $V_f$.

The control voltage $V_1$ is typically a fixed voltage, while the error voltage $V_f$ is variable. In operation, block 252 tends to increase the duty ratio of the output pulse when $V_f$ increases and reduces the length of the output pulse as $V_f$ decreases. As the sum of $V_1$ plus $V_f$ increases there is a corresponding decreased delay in generation of the signal to the S input of latch 258, i.e. the signal's rising edge appears more quickly. Since V1 is basically a fixed value, the increase is due to increased $V_f$. Similarly, the effect on block 256 of increased $V_f$ produces a longer delay at the R input to latch 258, i.e. the signal falling edge appears more quickly. For the case of increased $V_f$ as seen at point B, the rising edge of a pulse will have only a slight delay while the falling edge will have a much larger delay. This increases the length of the pulse.

Conversely, in the opposite case of decreasing $V_f$, latch 258 is set with a greater delay and reset with less delay. In this case the pulse length is shortened as the rising edge is delayed while the falling edge occurs more quickly. As illustrated in FIG. 14, small changes in the output voltage $V_f$ may have the desired impact on the duty ratio of the adjusted PWM signal.

Embodiments of the present invention also provide a method for correction of nonlinearities using analog feedback from a switching circuit, where the switching circuit starts with a digitally generated switching signal. In one embodiment, a correction circuit corrects for switch nonlinearities, nonlinearities due to break before make as well as nonidealities of the power supply. The analog feedback circuit achieves improved linearity, rejects power supply noise and reduces crosstalk between multiple channels operating from the same power supply. The correction works by modifying in analog domain the duty ratio of the digitally generated switching signal. The correction circuit can be implemented with discrete components or inside an integrated circuit.

In one aspect of the present invention, a switching circuit having feedback includes a differential duty ratio adjuster (DDRA) having a first input to receive a pulse width modulation (PWM) signal, a second input to receive a reference voltage, and a third input to receive a first feedback signal. The DDRA includes a first digital gate having a first input to receive the PWM signal, a first duty ratio modulator having a first input to receive the PWM signal and a second input to receive the first feedback signal, and a second digital gate having a first input to receive an output of the first duty ratio modulator.

In another aspect of the present invention, a method of providing feedback to a switching circuit includes a power stage. The method includes receiving a PWM signal, adjusting the PWM signal to form a lower noise PWM signal, modulating the PWM signal using feedback to form a corrected PWM signal, providing the corrected PWM signal to the power stage to produce an amplified PWM signal, and producing a feedback signal based at least in part on the amplified PWM signal and the lower noise PWM signal.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A switching circuit having feedback, comprising:
   a differential duty ratio adjuster (DDRA) having a first input to receive a pulse width modulation (PWM) signal, a second input to receive a reference voltage, and a third input to receive a first feedback signal, wherein the DDRA comprises:

a first digital gate having a first input to receive the PWM signal;

a first duty ratio modulator having a first input to receive the PWM signal and a second input to receive the first feedback signal; and a second digital gate having a first input to receive an output of the first duty ratio modulator.

2. The switching circuit of claim 1, further comprising an error amplifier coupled to the DDRA and having a first output to provide the first feedback signal to the DDRA.

3. The switching circuit of claim 2, wherein the first duty ratio modulator further comprises a first resistor, a second resistor, and a capacitor.

4. The switching circuit of claim 3, wherein:

a first terminal of the first resistor is coupled to the first feedback signal, and a second terminal of the first resistor is coupled to a first terminal of the second resistor and a first terminal of the capacitor;

a second terminal of the second resistor is coupled to receive the PWM signal; and a second terminal of the capacitor is coupled ground.

5. The switching circuit of claim 3, wherein the second resistor and capacitor slows down edge transitions of the PWM signal and introduces a time delay into the PWM signal.

6. The switching circuit of claim 5, wherein the first digital gate converts the output of the first duty ratio modulator to a digital signal.

7. The switching circuit of claim 2, further comprising:

a power stage having an input to receive an output of the second digital gate; and a summing node having a first input to receive an output of the power stage and a second input to receive an output of the first digital gate, wherein the summing node provides a difference to the error amplifier.

8. The switching circuit of claim 7, wherein the DDRA further comprises a second duty ratio modulator having a first input to receive the PWM signal, and coupled to provide an output to the first input of the first digital gate, wherein the first duty ratio modulator introduces a delay, and the second duty ratio modulator compensates for the delay.

9. The switching circuit of claim 8, wherein the second duty ratio modulator includes a second input to receive a second feedback signal.

10. The switching circuit of claim 8, wherein the second duty ratio modulator includes a second input coupled to ground.

11. The switching circuit of claim 8, wherein the first duty ratio modulator and the second duty ratio modulator each further comprise a first resistor, a second resistor, and a capacitor, wherein:

the second resistor and capacitor of the first duty ratio modulator introduces a time delay into the PWM signal, and the second resistor and capacitor of the second duty ratio modulator compensates for the time delay.

12. The switching circuit of claim 11, wherein second resistor and capacitor of the second duty ratio modulator further compensates for a time delay of the power stage.

13. The switching circuit of claim 8, further comprising:

a third digital gate having a first input to receive the PWM signal, a second input to receive the reference voltage, and an output coupled to the second duty ratio modulator and the first duty ratio modulator, wherein the third digital gate removes noise from the PWM signal.

14. The switching circuit of claim 9, wherein the error amplifier includes a second output to provide the second feedback signal to the second duty ratio modulator.

15. The switching circuit of claim 1, wherein the switching circuit is internal to an integrated circuit.

16. The switching circuit of claim 1, wherein:

the first digital gate has a second input to receive the reference voltage; and the second digital gate has a second input to receive the reference voltage.

17. A method of providing feedback to a switching circuit having a power stage, comprising:

receiving a PWM signal;

adjusting the PWM signal to form a lower noise PWM signal;

modulating the PWM signal using feedback to form a corrected PWM signal;

providing the corrected PWM signal to the power stage to produce an amplified PWM signal; and producing a feedback signal based at least in part on the amplified PWM signal and the lower noise PWM signal.

18. The method of claim 17, wherein modulating the PWM signal comprises selectively modifying a duty ratio corresponding to the PWM signal based at least in part on the feedback signal.

19. The method of claim 18, wherein modulating further comprises delaying the PWM signal.

20. The method of claim 19, wherein modulating the PWM signal uses at least two resistors and at least one capacitor.

21. The method of claim 19, wherein adjusting the PWM signal comprises delaying the PWM signal.

22. The method of claim 21, wherein delaying the PWM signal to form the lower noise PWM signal is performed to reduce the feedback signal.

23. The method of claim 17, wherein producing the feedback signal comprises calculating a difference between the lower noise PWM signal and the amplified PWM signal.

24. A switching circuit having feedback, comprising:

a differential duty ratio adjuster (DDRA) having a first input to receive a pulse width modulation (PWM) signal, a second input to receive a reference voltage, and a third input to receive a first feedback signal, wherein the DDRA comprises:

a first combinational logic circuit having an input for receiving the PWM signal and an output for providing a delayed PWM signal; and a second combinational logic circuit having a first input for receiving the PWM signal, a second input for receiving a feedback signal, and an output for providing a modulated PWM signal, wherein the modulated PWM signal is modulated in response to the feedback signal.

25. The switching circuit of claim 24, wherein:

the second combinational logic circuit further comprises a first delay line having a first input to receive the PWM signal and coupled to provide a delay in the modulated PWM signal; and the first combinational logic circuit comprises a second delay line having a first input to receive the PWM signal, wherein the second delay line provides a delay in the delayed PWM signal that is approximately equal to the delay in the modulated PWM signal.

26. The switching circuit of claim 25, wherein:
the second combinational logic circuit comprises a first latch coupled to the first delay line and having an output to provide the modulated PWM signal; and
the first combinational logic circuit comprises a second latch coupled to the second delay line and having an output to provide the delayed PWM signal.

27. The method of claim 25, wherein the first delay line includes a second input based at least in part on the feedback signal, wherein the feedback signal selectively modifies a duty ratio of the PWM signal to produce the modulated PWM signal.

28. The method of claim 27, wherein the second input is further based in part on a reference voltage, wherein the reference voltage is used in part to determine the delay of the modulated PWM signal.

29. The method of claim 28, wherein the second delay line includes a second input for receiving the reference voltage, wherein the reference voltage is used in part to determine the delay of the delayed PWM signal.

* * * * *

UNITED STATES PATENT AND TRADEMARK OFFICE
CERTIFICATE OF CORRECTION

PATENT NO. : 6,995,482 B2  Page 1 of 1
APPLICATION NO. : 10/828090
DATED : February 7, 2006
INVENTOR(S) : Pallab Midya et al.

It is certified that error appears in the above-identified patent and that said Letters Patent is hereby corrected as shown below:

Column 12, Line 62, Claim No. 1:
    Change "a differential duty ratio adjuster (DDRA)" to --a differential duty ratio adjuster (DDRA)--

Signed and Sealed this

Third Day of June, 2008

JON W. DUDAS
*Director of the United States Patent and Trademark Office*